(12) United States Patent
Nicholson

(10) Patent No.: US 6,967,767 B2
(45) Date of Patent: Nov. 22, 2005

(54) SWEPT WAVELENGTH BROADBAND RAMAN PUMP SOURCE

(75) Inventor: Jeffrey W. Nicholson, Chatham, NJ (US)

(73) Assignee: Fitel USA Corp, Norcross, GA (US)

( * ) Notice: Subject to any disclaimer, the term of this patent is extended or adjusted under 35 U.S.C. 154(b) by 385 days.

(21) Appl. No.: 10/390,859

(22) Filed: Mar. 18, 2003

(65) Prior Publication Data

US 2004/0196531 A1 Oct. 7, 2004

(51) Int. Cl.$^7$ .................. H01S 3/00; H04B 10/12
(52) U.S. Cl. ....................... 359/334; 359/341.3
(58) Field of Search ........................... 359/334

(56) References Cited

U.S. PATENT DOCUMENTS

| | | |
|---|---|---|
| 4,794,598 A | 12/1988 | Desurvire et al. |
| 5,847,863 A * | 12/1998 | Galvanauskas et al. .. 359/341.3 |
| 5,880,866 A | 3/1999 | Stolen |
| 5,959,750 A | 9/1999 | Eskildsen et al. |
| 6,052,394 A | 4/2000 | Lee et al. |
| 6,144,783 A | 11/2000 | Epworth et al. |
| 6,212,310 B1 | 4/2001 | Waarts et al. |
| 6,359,725 B1 | 3/2002 | Islam |
| 6,370,164 B1 | 4/2002 | Islam |
| 6,456,756 B1 | 9/2002 | Mead et al. |
| 6,775,447 B2 * | 8/2004 | Nicholson et al. ........ 385/122 |
| 2004/0145735 A1 * | 7/2004 | Silberberg et al. ........ 356/301 |
| 2005/0008044 A1 * | 1/2005 | Fermann et al. ........... 372/19 |

FOREIGN PATENT DOCUMENTS

WO    WO 99/66607    12/1999

* cited by examiner

Primary Examiner—Bernarr E. Gregory
Assistant Examiner—Eric Bolda

(57) ABSTRACT

A swept wavelength source for broad bandwidth Raman pump applications includes a source of ultrashort (e.g., picosecond) optical pulses. The pulse train output from the source is then applied as an input to a linear dispersive element (such as a section of negative dispersion-shifting fiber) which functions to "stretch" the ultrashort pulses, causing the pulses to become separated in time, with a continuous shift in the wavelength through the length of the pulse.

13 Claims, 5 Drawing Sheets

BANDWIDTH LIMITED PULSES → DISPERSION → CHIRPED PULSES

SWEPT WAVELENGTH BROADBAND RAMAN PUMP SOURCE

TECHNICAL FIELD

The present invention relates to Raman pump sources for optical amplification arrangements and, more particularly, to providing a high repetition rate swept wavelength Raman pump source useful for broad bandwidth applications.

BACKGROUND OF THE INVENTION

Fiber optic-based telecommunication networks are capable of transmitting data over several tens of kilometers without signal amplification. Transmitting data over distances greater than 100 kilometers requires that the signal be amplified. Currently, the two most popular optical amplifiers are erbium doped fiber amplifiers (EDFAs) and optical fiber amplifiers utilizing the Raman effect.

Regardless of the type of optical amplifier used in an optical network, the network's signal capacity is limited by the amplifier's spectral gain width as well as any associated gain non-uniformities. Gain non-uniformities within the utilized gain spectrum result in a non-uniform bit error rate across the network channels. Accordingly, a conventional network utilizing wavelength division multiplexing (WDM) technology requires gain flatness of less then±1.0 dB. As the demand for data increases, the required data rate increases, as does the number of required wavelength channels. Since the gain bandwidth of Raman amplifiers is not intrinsically limited, optical amplifiers based on the Raman effect have recently become the focus for commercial development.

The wavelength at which a Raman amplifier provides gain is determined by the wavelength of its pump laser. Therefore, through appropriate choice of pump wavelength, Raman amplifiers can provide signal amplification for any wavelength channel within the transparency range of an optical fiber. Broad bandwidth Raman amplifiers have become important for today's high speed communication systems. In order to achieve broad bandwidth, multiple pump wavelengths are normally used. However, the competing interests in providing both broad pump bandwidths and high pump powers (or the order of 1 W) have led to a number of problems. For example, pump-pump interactions cause the short wavelength pumps to transfer energy to the long wavelength pumps, increasing the power requirements on the short wavelength sources and causing complications in the gain flattening algorithms. Additionally, pump-pump interactions cause a "tilt" in the noise figure of the amplifier, increasing the noise figure of some channels. Pump-pump four wave mixing (FWM) can created new frequencies that lie directly over signal channels, causing impairments to a transmitted data stream.

These problems have been addressed in the past by using a wavelength multiplexed pump source that outputs a high power, single beam of relatively large bandwidth. U.S. Pat. No. 6,456,756 issued to R. D. Mead et al. on Sep. 24, 2002 discloses the formation of a Raman pump source utilizing one or more multi-gain element arrays multiplexed together within a single external resonator cavity. Interposed between the array and the resonator cavity output coupler are a collimating element and a diffraction grating. This combination forces each emitter within the array to lase at a distinct wavelength. Multiple arrays of differing center wavelength may then be packaged together to provide a broad bandwidth source.

The problems associated with prior art arrangements can be mitigated by separating the pump wavelengths temporally, so that they no longer overlap in time. Because Raman and FWM are very fast (femtosecond) processes, if the wavelengths do not overlap in time, pump-pump interactions cannot occur.

Such a pump can be realized by time division multiplexing pulsed pump sources together, or by continuously sweeping the wavelength of a single source. Because of the time dependent nature of the pump, such Raman amplifiers must be operated in a counter-pumped geometry, where the optical data signals propagate in the opposite direction of the pump, allowing the data signals to "see" an averaged gain, rather than a gain that fluctuates as a function of time. Estimates show that in order to perform swept wavelength pumping without impairments to the signals, the pump repetition rate must be greater than 100 kHz. Such a sweep rate is fast enough to ensure that the counter propagating signals see a constant, averaged gain.

A remaining problem in the prior art is the difficult in creating a pump source that has a sweep repetition rate greater than 100 kHz while also sweeping through a broad bandwidth (e.g., tens of nanometers).

SUMMARY OF THE INVENTION

The needs remaining in the prior art are addressed by the present invention, which relates to Raman pump sources for optical amplification arrangements and, more particularly, to providing a high repetition rate swept wavelength Raman pump source useful for broad bandwidth applications.

In accordance with the present invention, a high repetition rate swept wavelength Raman pump source is based on the utilization of "stretched" femtosecond pulses. A femtosecond pulse is ultrashort and, therefore, the spectrum of the pulse is extremely broad—tens to hundreds of nanometers. As generated in a laser, femtosecond pulses are typically very nearly bandwidth limited. That is, they have very small temporal and spectral phases. Consequently, all of the wavelengths in the spectrum of the pulses occur overlapped in time. It has been found that if a femtosecond pulse train propagates through a linear dispersive element, the pulses become chirped. In the time domain, the pulses are stretched and if the dispersion is strong enough, the pulses can be stretched to the point where they overlap in time. As a result, the dispersion causes the wavelengths to become separated in time, with a continuous shift in the wavelength occurring throughout the length of the pulse, creating the swept wavelength source.

In one embodiment of the present, a dispersion compensating fiber exhibiting a negative dispersion factor is used as the linear dispersive element. Other elements, such as cascaded fiber Bragg gratings, can be used. Additionally, a gain flattening filter may be used to shape the stretched spectrum to produce the desired gain and, if required, an amplifier may be used to boost the power to levels needed for Raman pumping.

Other and further embodiments and aspects of the present invention will become apparent during the course of the following discussion and by reference to the accompanying drawings.

BRIEF DESCRIPTION OF THE DRAWINGS

Referring to the drawings.

DETAILED DESCRIPTION

Figure 1:
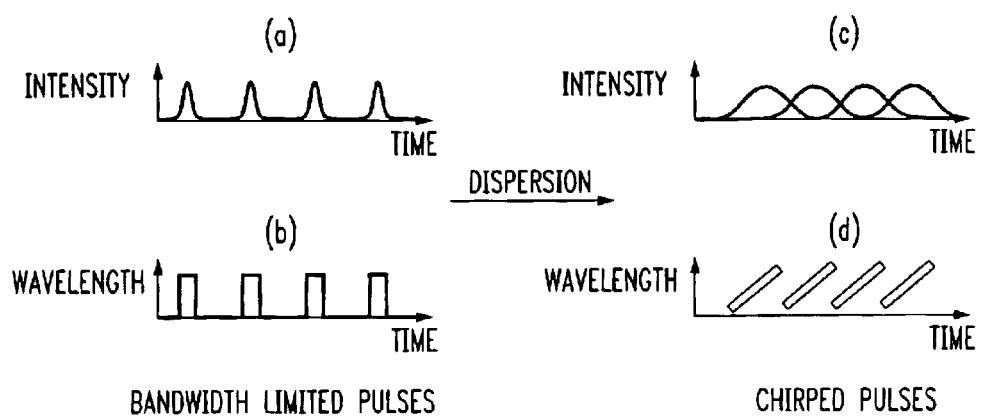
FIG. 1 contains a set of plots illustrating the intentional application of dispersion to ultrashort pulses to create a swept wavelength Raman source in accordance with the present invention.

FIG. 1 contains a set of plots illustrating the intentional application of dispersion to ultrashort pulses to "stretch" the pulses and thus create a swept wavelength Raman source in accordance with the present invention. FIG. 1(a) illustrates a femtosecond pulse train, shown in the time domain. Since these are ultrashort pulses (on the order of, for example, 2–3 fs), the spectrum of these pulses is extremely broad—in the range of tens to hundreds of nanometers. As generated in the laser, these pulses are typically very nearly bandwidth limited. That is, the ultrashort pulses exhibit very small temporal and spectral phases. Consequently, all of the wavelengths in the spectrum of the pulses occur overlapped in time, as shown in FIG. 1(b).

In accordance with the teachings of the present invention, if the pulse train propagates through a linear dispersive element, the pulses will become chirped. That is, in the time domain, the pulses will be stretched and if the dispersion is strong enough, the pulses can be stretched to the point where they overlap in time, as shown in FIG. 1(c). In this case, the dispersion causes the wavelengths to become separated in time, with a continuous shift in the wavelength occurring throughout the length of the pulse, as shown in FIG. 1(d). Such a dispersed pulse train is then used as the swept wavelength Raman source in accordance with the present invention.

The swept wavelength Raman source of the present invention, being based on stretched, ultrashort pulses, exhibits a number of advantages over the multiple source arrangement of the prior art. In particular, since the sweep repetition rate depends on the pulse repetition rate, a passively modelocked laser can be used to generate a very high sweep rate, on the order of tens of MHz, up to several GHz. By using passively modelocked lasers, no active electronics to generate the sweep rate are required. Additionally, the sweep bandwidth depends on the pulse bandwidth and, therefore, can also be very high. The desired bandwidth can be further increased through the use of nonlinear processes, such as continuum generation. Fiber lasers and dispersive fiber devices, as discussed below, can be used to create an all-fiber swept wavelength source.

Figure 2:
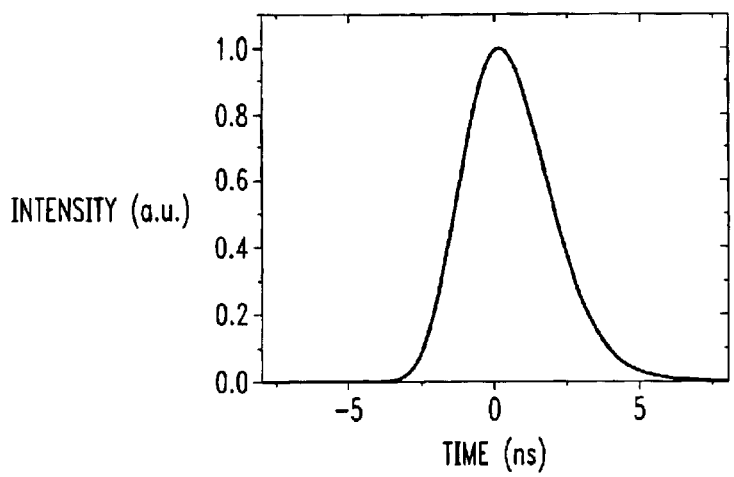
FIG. 2 is a graph of the temporal profile of a "stretched" pulse in accordance with the present invention.
Figure 3:
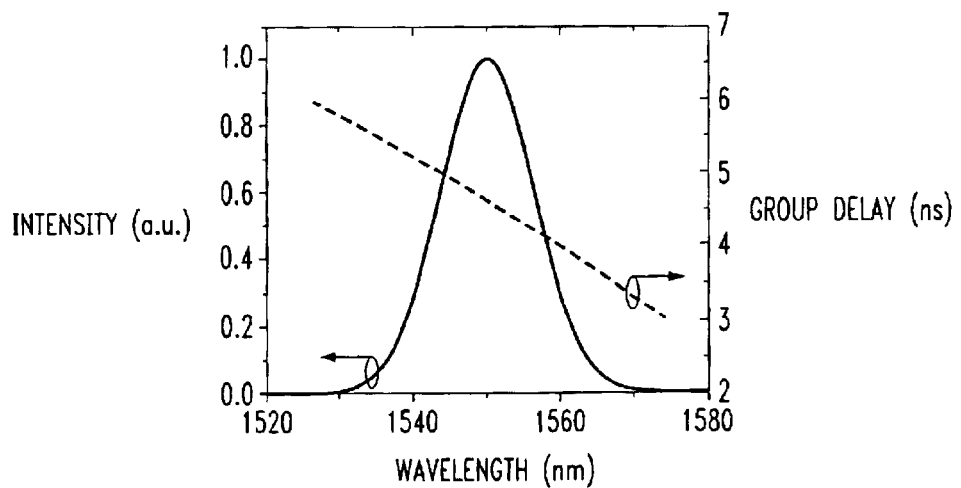
FIG. 3 is a graph illustrating the spectrum and group delay after propagating femtosecond pulses through dispersion compensating (stretching) fiber.

FIG. 2 contains a graph of a "stretched" femtosecond pulse after propagating through 700 meters of dispersion compensating fiber, where in particular negative dispersion shifting fiber was used, and is considered necessary to prevent the formation of solutions. Negative dispersion in the swept wavelength source is also required, since a positive dispersion swept wavelength source would tend to stretch further in the positive dispersion transmission span, causing temporal overlap of the sweep wavelengths. A 200 fs pulse, centered at 1550 nm was injected into the fiber, resulting the profile as shown in FIG. 2. It is to be noted that the pulse width has been broadened (stretched) from 200 fs to a few ns, an increase in pulse width by a factor of $10^4$. In spite of the extreme broadening, the pulse maintains a clean temporal profile, due to the nature of linear propagation along the fiber. The pulse spectrum and group delay as a function of wavelength after propagating through the negative dispersion shifting fiber are shown in FIG. 3. Over the entire pulse bandwidth, the spectrum shows an almost linear group delay as a function of wavelength. While this particular example utilized a relatively long section of negative dispersion fiber (700 meters), more modest lengths of fiber have been found to introduce group delays on the order of nanoseconds (or greater), leading to significant pulse stretching.

Figure 4:
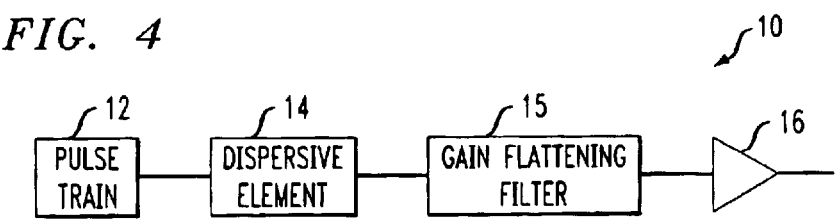
FIG. 4 illustrates, in block diagram form, an exemplary Raman source generating a swept wavelength signal in accordance with the present invention.
Figure 5:
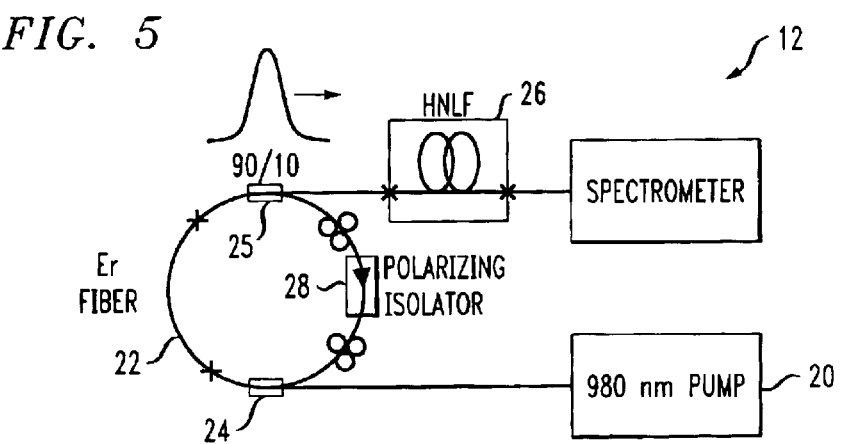
FIG. 5 illustrates an experimental setup of a mode-locked erbium laser that may be used to generate the necessary femtosecond pulses.

An exemplary swept wavelength Raman source 10 of the present invention is illustrated in FIG. 4. A pulse train source 12, discussed in detail below in association with FIG. 5, is used to create a femtosecond pulse train with a desired center wavelength (for conventional fiber amplifier purposes, a wavelength of 1550 nm is commonly used). The created pulse train is then applied as an input to a linear dispersive element 14 that is used to impart a defined amount of negative dispersion, as discussed above, to the pulse train. In one embodiment, a section of dispersion shifting fiber (as discussed above) may be used. Alternatively, a cascaded fiber Bragg grating arrangement may be used to provide the required dispersion to the pulse train. A gain flattening filter 15 is then used to shape the dispersive spectrum to produce the desired gain. An output amplifier 16 may be used (but is not required) to boost the optical power to levels required for Raman pumping.

FIG. 5 illustrates one exemplary pulse train source 12, using a modelocked Er laser. Indeed, one of the practical difficulties in demonstrating stretched femtosecond pulses as a swept wavelength Raman pump is in generating the desired wavelength. In most telecommunication applications, the pump should reside somewhere in the range of 1420 to 1490 nm. The potential sources for such pumps include thulium doped lasers, modelocked semiconductor lasers, and erbium doped lasers, shifted in wavelength with nonlinear optics. Referring to FIG. 5, a 980 nm conventional pump source 20 is used, and the output is then launched into a ring of erbium-doped fiber 22 to provide modelocking. A first coupler 24 is used to couple the output from source 20 into fiber ring 22 and a second coupler 25 is used to couple the modelocked pulse train into a wavelength shifting element 26. One exemplary wavelength shifting element useful in forming the source of the present invention comprises a highly nonlinear section of dispersion shifted fiber. The repetition rate for the generated pulse train was on the order of 33 MHz. As shown in FIG. 5, a polarizing isolator 28 is used to prevent reflections from propagating in the reverse direction through ring 22. In a preferred embodiment, couplers 24 and 25 maintain a majority of the signal energy (e.g., 90%) within ring 22 to provide sufficient performance of the source.

Figure 6:
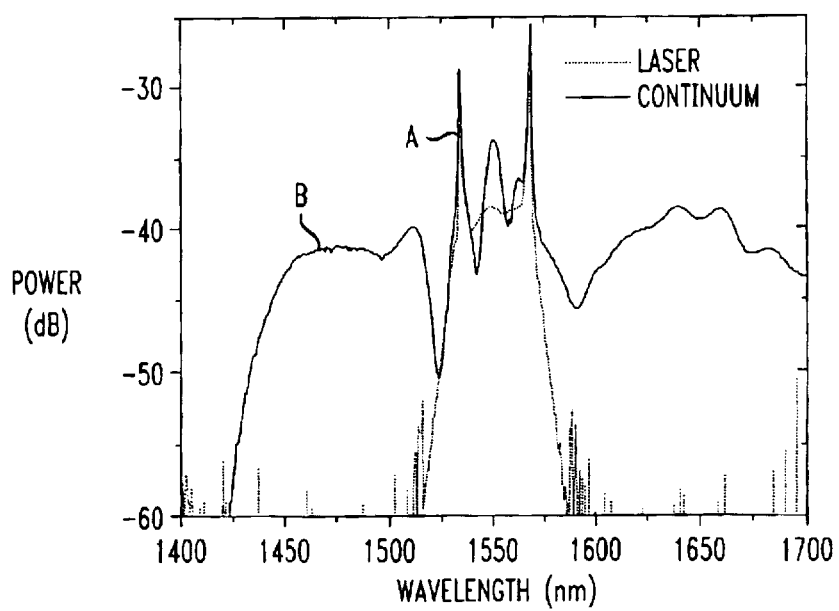
FIG. 6 contains a graph of the spectrum of the modelocked Er laser and the generated continuum associated therewith.

FIG. 6 contains a pair of graphs illustrating the performance of the arrangement as shown in FIG. 5, where curve A is associated with the output of pump source 20 and curve B is the signal spectrum subsequent to passing through wavelength shifting element 26. As shown in curve B of FIG. 6, the source of the present invention is useful in generating spectral components in the wavelength region between 1420 and 1490 nm, the region of interest for Raman pumping.

Figure 7:
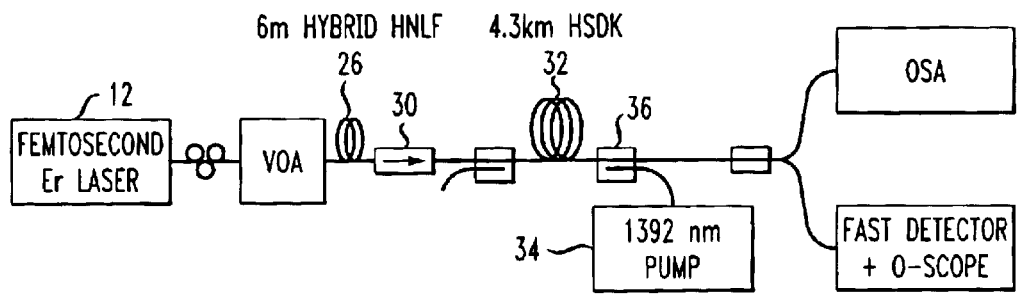
FIG. 7 depicts an experimental setup of a stretched pulse source formed in accordance with the present invention.

The exemplary Er-based modelocked pulse train source 12 as illustrated in FIG. 5 can be utilized in the arrangement as illustrated in FIG. 7. As shown, the output continuum from wavelength shifting element 26 is passed through an isolator 30 and applied as an input to a section of negative dispersion fiber 32, used as the linear dispersive element in the swept wavelength Raman source of the present invention. In the particular arrangement as shown in FIG. 7, a 4.3 km length of negative dispersion fiber 32 was used. As discussed above, the presence of the negative dispersion element serves to "stretch" the ultrashort pulses generated by pulse train source 12. In the arrangement as shown in FIG. 7, a high power 1392 nm laser 34 is coupled, in a counter-propagating direction, to negative dispersion fiber 32, using a coupler 36. The amplified output signal was then characterized in both the time and spectral domains to assess the pulse stretching capabilities of the arrangement. Power levels as high as 100 mW have been detected at the output of fiber 32.

Figure 8:
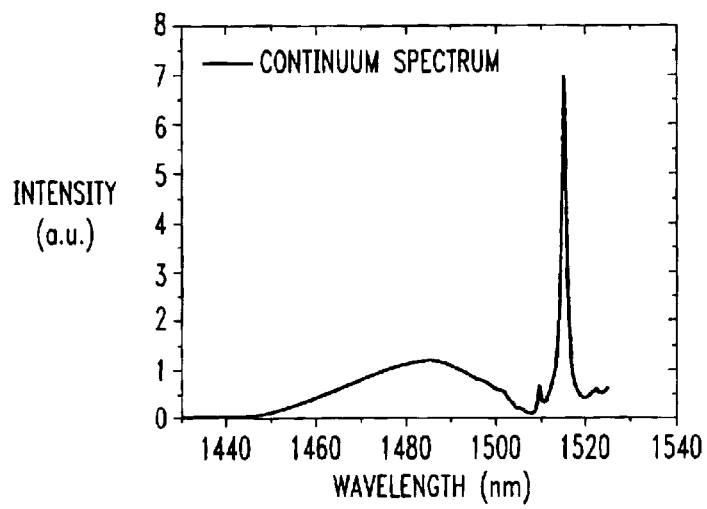
FIG. 8 is a graph illustrating the continuum spectrum as launched into the setup of FIG. 7.
Figure 9:
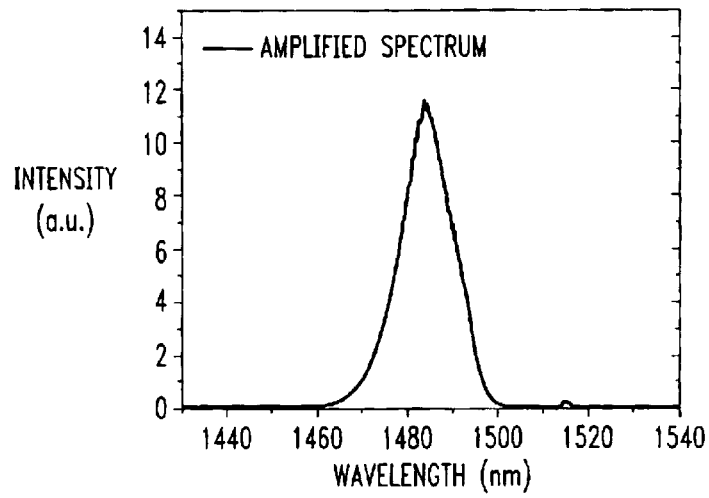
FIG. 9 illustrates the amplified spectrum associated with this arrangement.

FIG. 8 contains a graph illustrated the continuum spectrum appearing at the output of wavelength shifting element and thereafter applied as an input to negative dispersion fiber 32. As noted above, for Raman pumping purposes, the wavelength region between 1420 and 1490 nm is of interest, and the spike at 1518 nm (a residual soliton spike) can be ignored. The amplified spectrum appearing at the output of fiber 32 is shown in FIG. 9. As shown, the main portion of the spectrum has been amplified, effectively suppressing the residual soliton spike.

Figure 10:
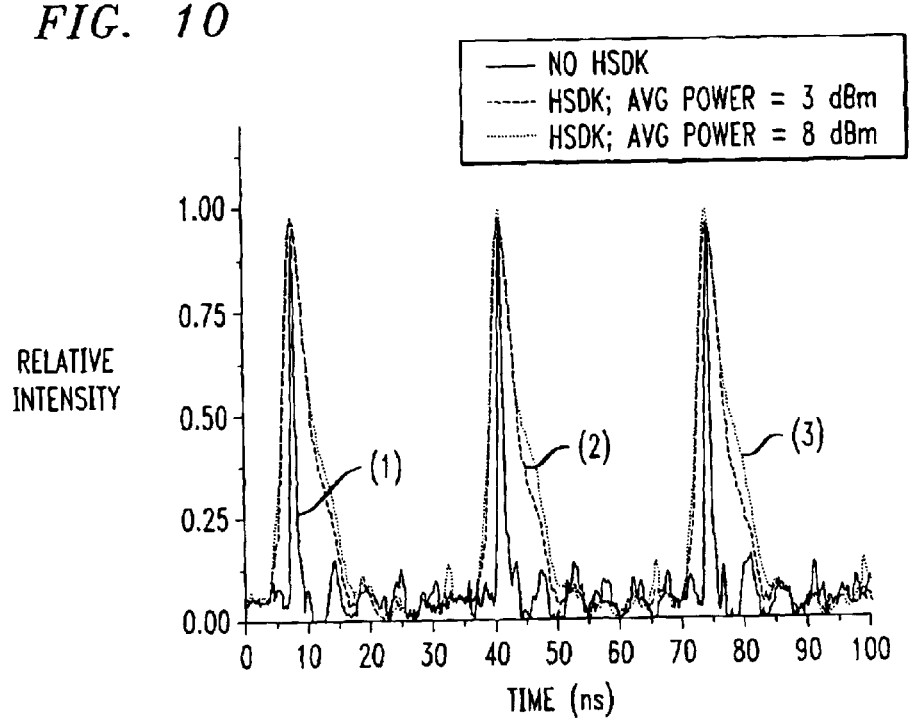
FIG. 10 contains a graph illustrating a femtosecond pulse train prior to "stretching" (curve A), a first stretched pulse train at a first amplification level (curve B), and a second stretched pulse train at a second amplification level (curve C).

FIG. 10 illustrates a comparison between an input (unstretched) pulse train, and two different stretched pulse trains (each associated with a different level of amplification). Curve (1) in FIG. 10 illustrates the unstretched pulse train as it appears at the input of fiber 32. Since the pulse train has not been stretched at this point, the detected pulse train is essentially the impulse response of the elements used to detect this signal (not shown). Each pulse is shown as exhibiting a width on the order of 2–3 nanoseconds. Curve (2) in FIG. 10 illustrates a first stretched pulse train, appearing at the output of fiber 32, for an amplification level of 3 dBm. Curve (3) illustrates a second stretched pulse train, associated with an amplification level of 8 dBm. In each case, the pulses have been stretched to several nanoseconds (on the order of tens of nanoseconds). As shown, the amplification level does not significantly change the shape of the pulses, indicating that the stretching function of the present invention in the negative dispersion fiber is essentially linear.

Figure 11:
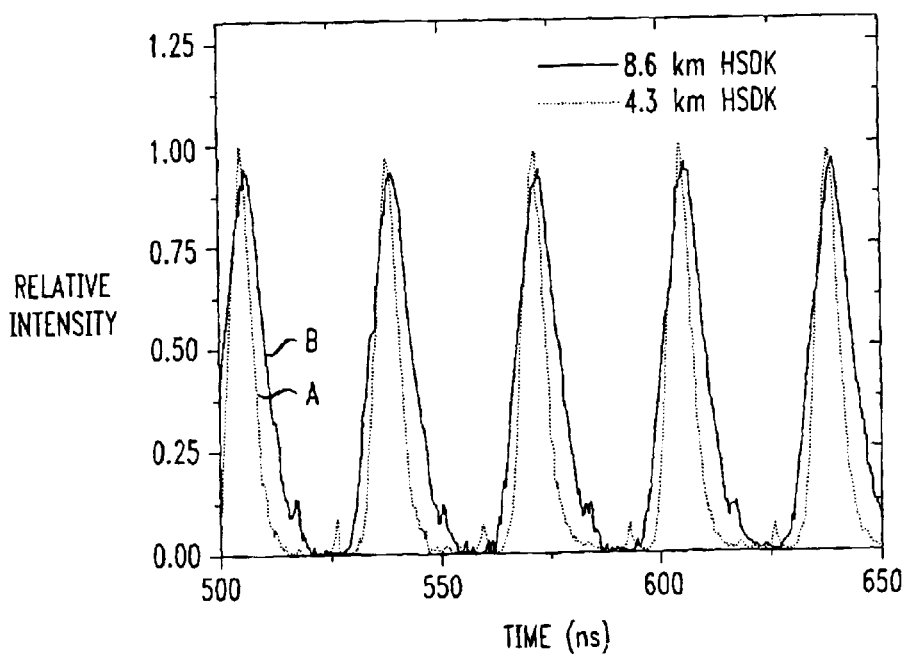
FIG. 11 contains a graph of an exemplary pair of stretched pulse trains appearing at the output of the arrangement of the present invention.

FIG. 11 illustrates a pair of exemplary stretched pulse trains as appearing at the output of the linear dispersive element of the present invention, in this case illustrating the use of two different lengths of negative dispersion fiber as the linear dispersive element. Curve A of FIG. 11 is associated with a length of 4.3 km negative dispersion fiber (as is the example discussed above in association with FIG. 7) and curve B of FIG. 11 is associated with a negative dispersion fiber of length 8.6 km (twice the length as associated with curve A). As shown, the difference in fiber length results in imparting a different "stretching" to the pulses.

Figure 12:
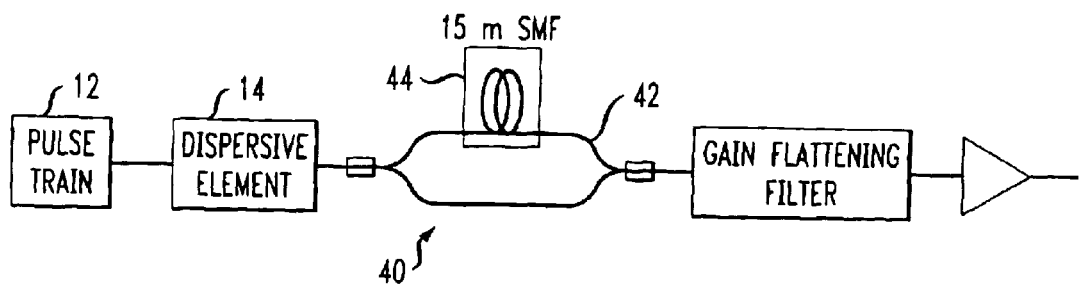
FIG. 12 illustrates an exemplary unbalanced Mach-Zehnder interferometer of the present invention.
Figure 13:
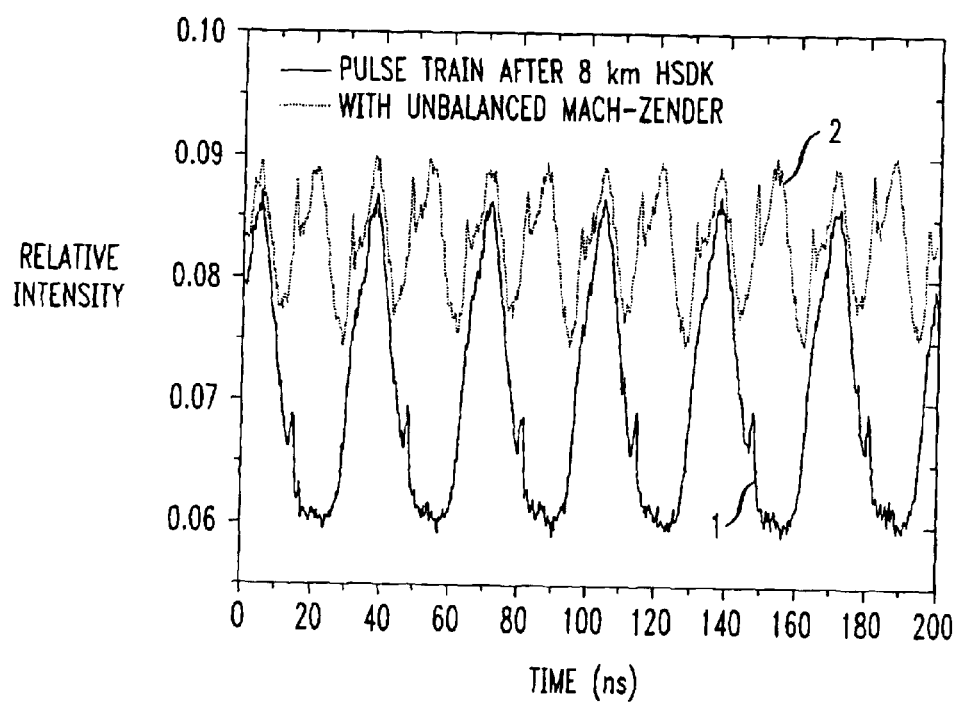
FIG. 13 contains a graph illustrating the stretched pulse output from the arrangement of FIG. 12.

It is to be further noted that the repetition rate of the swept wavelength source of the present invention can be arbitrarily increased over that associated with the generating laser source (such as generating laser source 100). In particular, an unbalanced Mach-Zehnder interferometer 40, as shown in FIG. 12, can be used to increase the repetition rate, with a first arm 42 of interferometer 40 formed to include a delay element 44 (such as an additional length of single mode fiber), where interferometer 40 is inserted in the signal path at the output of the linear dispersive element. Delay element 44 is used to delay by half the repetition rate of pulse train source 12, effectively doubling the repetition rate of the pulse train. Thus, the pulses can be stretched to the point where they overlap in time, as shown in FIG. 13. In particular, FIG. 13 illustrates a stretched pulse train at the output of 8 km of negative dispersion fiber (curve 1), as well as a stretched pulse train at the output of an exemplary unbalanced interferometer (curve 2).

As will be understood by those familiar with the art, the present invention may be embodied in other specific forms without departing from the spirit or essential characteristics thereof. Accordingly, the disclosures and descriptions herein are intended to be illustrative only, and not limiting, of the scope of the invention as set forth in the claims appended hereto.

What is claimed is:

1. A swept wavelength Raman pump source for optical signal amplification, the source comprising
   an optical pulse train signal source for generating ultrashort optical pulses centered at a defined wavelength; and
   a linear dispersive element coupled to the output of the optical pulse train signal source for imparting a negative dispersion to the pulse train and stretching the pulse width of the ultrashort optical pulses to a determined length sufficient to overlap adjacent pulses.

2. A swept wavelength Raman pump source as defined in claim 1 wherein the source further comprises a gain flattening filter to shape the output of the linear dispersive element to produce a defined gain level.

3. The swept wavelength Raman pump source as defined in claim 1 wherein the linear dispersive element comprises a section of negative dispersion shifting fiber of a defined length, the length of said section of negative dispersion shifting fiber being directly proportion to the amount of stretching introduced to the ultrashort pulses.

4. The source as defined in claim 1 wherein the linear dispersive element comprises a cascaded fiber Bragg grating.

5. The source as defined in claim 1 wherein the optical pulse train signal source comprises a modelocked doped fiber laser.

6. The source as defined in claim 5 wherein the modelocked doped fiber laser comprises a thulium-doped fiber laser.

7. The source as defined in claim 5 wherein the mode-locked doped fiber laser comprises an erbium-doped fiber laser.

8. The source as defined in claim 7 wherein the optical pulse train signal source further comprises a section of highly nonlinear dispersion shifted fiber to move the center wavelength of the ultrashort pulse train into the defined wavelength region.

9. The source as defined in claim 8 wherein the defined wavelength region encompasses the region of 1420 to 1490 nm.

10. The source as defined in claim 1 wherein the source further comprises an unbalanced interferometer, coupled to the output of the linear dispersive element, to increase the repetition rate of the swept wavelength source.

11. The source as defined in claim 10 wherein the unbalanced interferometer comprises a Mach-Zehnder interferometer with a delay element disposed along a first arm of said interferometer.

12. The source as defined in claim 11 wherein the delay element comprises a section of single mode fiber of a length sufficient to introduce a desired amount of delay.

13. The source as defined in claim 1 wherein the source further comprises an output power amplifier disposed beyond the output of the linear dispersive element, the output power amplifier to boost the output power for use in a Raman amplification process.

* * * * *